(12) United States Patent
Taguchi

(10) Patent No.: US 7,125,113 B2
(45) Date of Patent: Oct. 24, 2006

(54) INKJET RECORDING METHOD

(75) Inventor: Toshiki Taguchi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 97 days.

(21) Appl. No.: 10/680,088

(22) Filed: Oct. 8, 2003

(65) Prior Publication Data

US 2004/0090506 A1 May 13, 2004

(30) Foreign Application Priority Data

Oct. 9, 2002 (JP) ............................ P2002-296451
Oct. 3, 2003 (JP) ............................ P2003-345444

(51) Int. Cl.
*B41J 2/01* (2006.01)
*G01D 11/00* (2006.01)

(52) U.S. Cl. ...................................... 347/105; 347/100

(58) Field of Classification Search ................ 347/95, 347/96, 100, 101, 105, 98; 428/195, 32.1; 523/160
See application file for complete search history.

(56) References Cited

U.S. PATENT DOCUMENTS

| 5,380,769 | A | * | 1/1995 | Titterington et al. ........ 523/161 |
| 5,648,405 | A | * | 7/1997 | Ma et al. ..................... 523/160 |
| 6,030,755 | A | * | 2/2000 | Matsumoto et al. ......... 430/351 |
| 6,492,769 | B1 | * | 12/2002 | Oda et al. .................... 313/495 |
| 2001/0023652 | A1 | * | 9/2001 | Ohya et al. ............... 106/31.75 |
| 2003/0097960 | A1 | * | 5/2003 | Ito et al. ................... 106/31.58 |
| 2003/0202039 | A1 | * | 10/2003 | Rutland et al. ................ 347/37 |
| 2004/0011247 | A1 | * | 1/2004 | Taguchi .................... 106/31.27 |
| 2004/0071953 | A1 | * | 4/2004 | Sobieski ..................... 428/327 |

FOREIGN PATENT DOCUMENTS

| JP | 2-309352 A | 12/1990 |
| JP | 3-63648 A | 3/1991 |

\* cited by examiner

*Primary Examiner*—Stephen Meier
*Assistant Examiner*—Leonard Liang
(74) *Attorney, Agent, or Firm*—Sughrue Mion, PLLC

(57) ABSTRACT

An inkjet recording method comprising ejecting ink droplets on an image-receiving material according to recording signals to record an image on the image-receiving material, wherein at least one of the ink and the image-receiving material comprises an acid precursor capable of releasing an acid by a chemical reaction.

7 Claims, No Drawings

INKJET RECORDING METHOD

FIELD OF THE INVENTION

The present invention relates to an inkjet recording method of giving an image having excellent durability under high-humidity conditions.

BACKGROUND OF THE INVENTION

Accompanying recent popularization of computers, an inkjet printer is widely used for printing letters or an image on paper, film, cloth or the like not only in offices but also at homes.

The inkjet recording method includes a system of jetting out (ejecting) a liquid droplet by applying a pressure using a piezo element, a system of jetting out a liquid droplet by generating a bubble in an ink under heat, a system of using an ultrasonic wave, and a system of jetting out a liquid droplet by suction using an electrostatic force. The ink composition used for such inkjet recording includes an aqueous ink, an oily ink and a solid (fusion-type) ink. Among these inks, an aqueous ink is predominating in view of production, handleability, odor, safety and the like.

The coloring agent used in such an ink for inkjet recording is required to have high solubility in a solvent, enable high-density recording, provide good color, exhibit excellent fastness to light, heat, air, water and chemicals, ensure good fixing on an image-receiving material and less blurring, give an ink having excellent storability, have high purity and no toxicity, and be available at a low cost. However, it is very difficult to find out a coloring agent satisfying these requirements in a high level.

Various dyes and pigments for inkjet use have been already proposed and actually used, however, a coloring agent satisfying all requirements is not yet found out at present. Conventionally well-known dyes and pigments having a color index (C.I.) number can hardly satisfy both color hue and fastness required of the ink for inkjet recording. Studies have been heretofore made on dyes having good color and fastness with an attempt to develop an excellent coloring agent for inkjet use. However, in the compound called a water-soluble dye, a water-soluble group is necessarily substituted. If the number of the water-soluble groups is increased to as to enhance the stability of ink, this has been found to incur a problem that the image formed is readily blurred under high humidity conditions, that is, it is difficult to combine the stability of ink and the resistance against blurring.

In silver salt diffusion transfer, it is described in JP-A-3-63648 that carbonyl aceto compound can be used to prevent blurring of a transferred image. Also, in JP-A-2-309352, it is described that carboxy ester or sulfo ester can be used for the same purpose. However, it had not been considered about such method for preventing of blurring in the field of a transferred image of ink jet recording using other kinds of dyes.

SUMMARY OF THE INVENTION

An object of the present invention is to provide an inkjet recording method of giving an image ensured with less occurrence of blurring even under high humidity conditions.

The object of the present invention can be attained by the inkjet recording method in the following (1) to (6):

(1) An inkjet recording method comprising ejecting ink droplets on an image-receiving material according to recording signals to record an image on the image-receiving material, wherein at least one of the ink and the image-receiving material comprises an acid precursor capable of releasing an acid by a chemical reaction.

(2) The inkjet recording method described in (1) above, wherein one of the acid precursor and a compound which reacts with the acid precursor to release an acid is contained in the ink, and another one of the acid precursor and the compound is contained in the image-receiving material.

(3) The inkjet recording method described in (1) above, wherein one of the acid precursor and a compound which reacts with the acid precursor to release an acid is contained in the ink, and another one of the acid precursor and the compound is contained in another ink.

(4) The inkjet recording method described in (1) above, wherein at least one member selected from the group consisting of the acid precursor and a plurality of compounds those react with the acid precursor to release an acid is contained in the ink, at least one other member selected from the group is contained in another ink, and at least one still other member selected from the group is contained in the image-receiving material.

(5) The inkjet recording method described in any one of (1) to (4) above, wherein at least one ink containing the acid precursor is a colorless ink having substantially no absorption in a visible light region.

(6) The inkjet recording method described in any one of (2) to (5) above, wherein the acid precursor is a compound comprising an atom which changes to a hard acid by the chemical reaction or an atomic group which changes to a hard acid by the chemical reaction, and the compound which reacts with the acid precursor to release an acid is a compound comprising a nucleophilic group.

DETAILED DESCRIPTION OF THE INVENTION

The present invention is described in detail below.

The inkjet recording method of the present invention is characterized by jetting out ink droplets according to recording signals on an image-receiving material to record an image on the image-receiving material, wherein at least either one of the ink and the image-receiving material comprises an acid precursor.

The acid precursor means a compound which is not an acid but can be changed to an acid by reaction or can release an acid by reaction. And, in a system of a inkjet, the acid precursor means a compound which does not exhibit acidity at the preparation or storage of ink but releases an acid in aging or due to a reaction after printing or can render the system acidic as a result of a reaction. Examples of such a compound include esters, amides and imides, which can release a carboxylic acid by hydrolysis. In addition, compounds having a structure equivalent to an acid chloride, such as a halogen atom substituted to a carbon atom of a $C=N$ double bond, can be used.

Other examples include a compound which releases an acid under light, a compound which is released into air and thereby oxidized with oxygen to exhibit acidity, and an acid breeding agent of producing an acid by a chain reaction.

In particular, the present invention is characterized by using an acid precursor capable of releasing an acid by a reaction of two or more kinds of compounds. More specifically, in the present invention, after an image-receiving material accepts an ink droplet, two or more part compounds contained at least in either one of the ink and the image-receiving material react, as a result, the ink-accepting portion is rendered acidic and thereby less undergoes blurring.

In the specification, all of the above-described two or more kinds of compounds are basically called as "acid precursor". But, in the case that each of them should be identified, a compound having a precursor group of an acid is called as "acid precursor", and a compound which reacts with the "acid precursor" is called as "releaser". The precursor group means a group capable of being decomposed by a reaction to an acidic compound having pKa of 4 or less. The acid precursor in narrow definition which has a precursor group preferably has a group capable of changing to a hard acid as a precursor group. The releaser is preferably a nucleopetal compound capable of decomposing the acid precursor.

It is also possible that at least one compound constituting the acid precursor and necessary for the reaction is contained in the ink and a compound of reacting with the compound contained in the ink is contained in the image-receiving material or that at least one compound necessary for the reaction is contained in the ink and a compound of reacting with the compound contained in the ink is contained in another ink.

Furthermore, when the acid precursor is a compound capable of releasing an acid by a reaction of three or more part compounds, it is possible that at least one compound necessary for the reaction is contained in the ink, at least one other compound is contained in another ink, and at least one still other compound is contained in the image-receiving material.

At least one ink containing the acid precursor is preferably a color less ink having substantially no absorption in the visible light region. The term "having substantially no absorption" as used in the present invention means that the reflection density (Dvis) of a printed matter is 0.2 or less in the visible light region.

Examples of the reaction of these compounds include:

(i) a decomposition or exchange reaction of an acid derivative, where an amine as a base is consumed or a carboxylic acid is produced, as a result, the system becomes acidic;

(ii) a reaction where a hard anion is eliminated by a nucleophilic substitution reaction and thereby the pH of the system is decreased, such as a reaction of a benzyl halide or a sulfonic acid ester of alcohol with a nucleophilic agent (e.g., amine, thiol); and (iii) a reaction of a nucleophilic agent and a compound represented by the following formula (B) which is an acid equivalent capable of changing to a carboxylic acid derivative by ring-opening:

Formula (B):

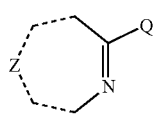

wherein Z represents an atomic group capable of forming a nitrogen-containing heterocyclic ring, and Q represents a halogen atom or a group selected from an alkoxy group, an aryloxy group, an alkylthio group, an arylthio group, an acyloxy group, an alkylsulfonyl group, an arylsulfonyl group, an alkylsulfonyloxy group and an arylsulfonyloxy group.

The compound which can be used includes:

(iv) an acid breeding compound capable of releasing an acid by a chain reaction triggered from one reaction; examples thereof include the compound described in Ichimura et al., *Angew. Chem. Int. Ed.* 2000, 39, 3425-, that is, a compound which can be consecutively decomposed in the presence of a small amount of proton to release an acid; the principle thereof resides in a mechanism that acetal ketal, epoxide or the like which is easily decomposable under the action of an acid is present in the molecule and this group is decomposed to induce a β-elimination reaction or the like and in turn eliminate a splitting-off group having a low pKa together with a proton, as a result, an acid is further generated; and (v) a compound of generating an acid by a chelating reaction, such as picolinic acid and calcium or magnesium salt of a strong acid.

Examples of the acid precursor (the acid precursor in narrow definition which has a precursor group of an acid) which can be preferably used in the present invention are set froth below, however, the pr sent invention is of course not limited thereto.

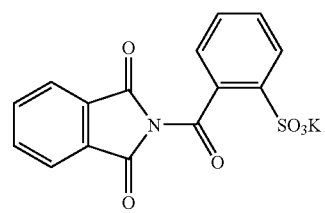

X-1

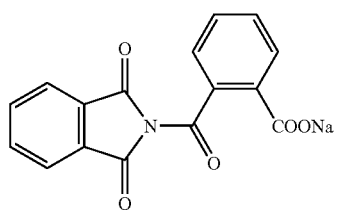

X-2

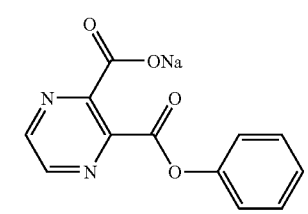

X-3

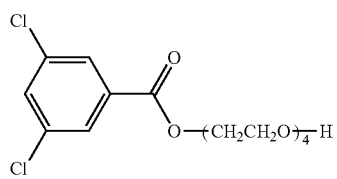

X-4

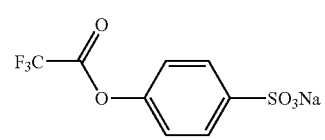

X-5

-continued
X-6
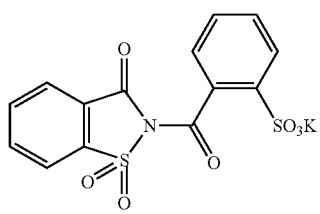
X-7
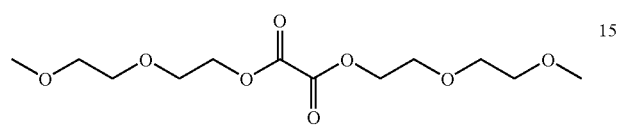
X-8
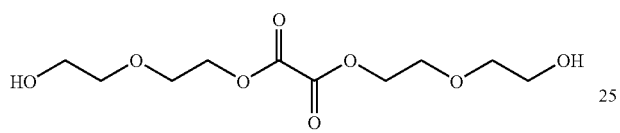
X-9
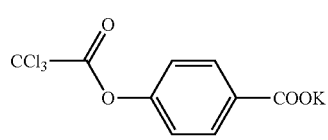
X-10
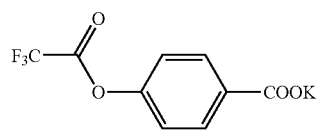
X-11
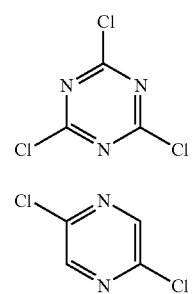
X-12
X-13
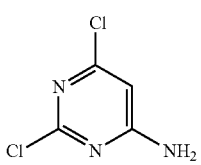
X-14
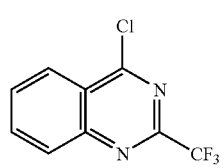
-continued
X-15
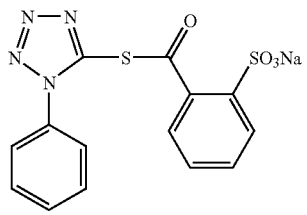
X-16
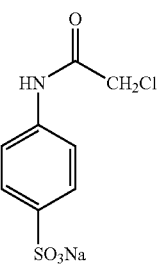
X-17
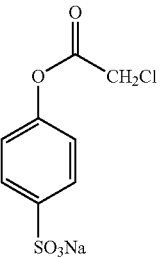
X-18
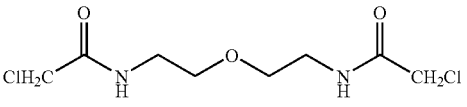
X-19
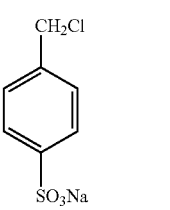
X-20
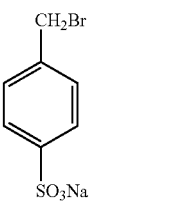
X-21
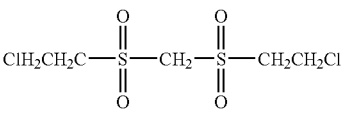
X-22
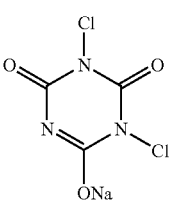

The compounds which can react with Compounds X-1 to X-22 above and generate an acid are set forth below, however, the present invention is not limited thereto.

Y-1 Aqueous ammonia
Y-2 Ammonium carbonate
Y-3 Ammonium acetate
Y-4 Piperidinium carbonate
Y-5 Potassium hydrogensulfite
Y-6 Sodium hydrogensulfite
Y-7 Ammonium sulfite
Y-8 Quinacridine acetate
Y-9 Sodium benzenesulfinate
Y-10 Potassium benzenesulfinate
Y-11 Thiourea
Y-12 Ethylenethiourea These compounds each may be contained in the ink or in the image-receiving material.

In the case where each of the acid precursor and the releaser used in the present invention are contained in an ink, those are preferably contained in the ink in an amount of 0.01 to 20 mass % (% by weight), more preferably from 0.1 to 10 mass %, still more preferably from 0.5 to 5 mass %. In the case where one of the acid precursor and the releaser is contained in the image-receiving material, the one is preferably from 0.001 to 100 $g/m^2$, more preferably from 0.01 to 10 $g/m^2$, still more preferably from 0.05 to 5 $g/m^2$.

The ink for use in the inkjet recording method of the present invention is described below.

The ink for use in the present invention is an ink obtained by dissolving a dye in water or in an organic solvent, preferably an aqueous solution-type ink using a water-soluble dye.

In the ink for use in the present invention, two or more dyes may be used in combination for obtaining a full color image or adjusting the color tone. Examples of the dye which can be used in the present invention include the followings.

Examples of the yellow dye include aryl- or heteryl-azo dyes having a coupling component selected from phenols, naphthols, anilines, pyrazolones, pyridones and open chain-type active methylene compounds; azomethine dyes having a coupling component selected from open chain-type active methylene compounds; methine dyes such as benzylidene dye and monomethine oxonol dye; and quinone-base dyes such as naphthoquinone dye and anthraquinone dye. Other examples of the dye species include quinophthalone dye, nitro•nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the magenta dye include aryl- or heteryl-azo dyes having a coupling component selected from phenols, naphthols and anilines; azomethine dyes having a coupling component selected from pyrazolones and pyrazolotriazoles; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a coupling component selected from phenols, naphthols and anilines; and indigo•thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

A black dye such as polyazo dye can also be used.

Furthermore, a water-soluble dye such as direct dye, acid dye, food color, basic dye and reactive dye may be used in combination. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

Furthermore, a pigment can also be used in combination.

As the pigment which can be used in the ink for use in the present invention, commercially available pigments and known pigments described in various publications can be used. The publication includes *Color Index*, compiled by The Society of Dyers and Colourists, *Kaitei Shin Han Ganryo Binran (Revised New Handbook of Pigments)*, compiled by Nippon Ganryo Gijutsu Kyokai (1989), *Saishin*

*Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the organic pigment include azo pigments (e.g., azo lake pigment, insoluble azo pigment, condensed azo pigment, chelate azo pigment), polycyclic pigments (e.g., phthalocyanine-base pigment, anthraquinone-base pigment, perylene- or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments. Specific examples of the inorganic pigment include yellow pigments such as C.I. Pigment Yellow 34, 37, 42 and 53, red-type pigments such as C.I. Pigment Red 101 and 108, blue-type pigments such as C.I. Pigment Blue 27, 29 and 17:1, black-type pigments such as C.I. Pigment Black 7 and magnetite, and white-type pigments such as C.I. Pigment White 4, 6, 18 and 21.

The pigment having a preferred color tone for the formation of an image include the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanines such as C.I. Pigment Blue 15:1, 15:2, 15:3, 15:4 and 15:6, monochloro to low chlorinated copper phthalocyanines, aluminum phthalocyanines such as pigments described in European Patent 860475, nonmetallic phthalocyanines such as C.I. Pigment Blue 16, and phthalocyanines with the center metal being Zn, Ni or Ti, and among these, C.I. Pigment Blue 15:3 and 15:4 and aluminum phthalocyanines are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment Yellow 93, 94, 95, 128 and 155, and benzimidazolone-type C.I. Pigment Yellow 120, 151, 154, 156 and 180, and among these, those not using a benzidine-base compound as a raw material are more preferred), isoindoline•isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The above-described pigment can be used as it is in the ink for use in the present invention or may be surface-treated and then used. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342 (the term "JP-A" as used herein means an "unexamined published Japanese patent application"), JP-A-10-140065, JP-A-10-292143 and JP-A-11-166145.

Particularly, self-dispersible pigments prepared by using a diazonium salt to act on carbon black described in U.S. patents of (4) and capsulated pigments prepared by the method described in Japanese Patent Publications of (5) are effective because dispersion stability can be obtained without using an excess dispersant in the ink.

In the ink for use in the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the ink for use in the present invention is, after the dispersion, preferably from 0.01 to 10 µm, more preferably from 0.05 to 1 µm.

As for the method of dispersing the pigment, known dispersion techniques used at the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

The surfactant which can be contained in the ink for use in the inkjet recording method of the present invention is described below.

In the present invention, a surfactant is incorporated into the inkjet recording ink to control the liquid properties of ink, whereby excellent effects can be provided, such as improvement of ejection stability of the ink, elevation of water resistance of the image and prevention of blurring of the printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 mass %, preferably from 0.005 to 10 mass %, more preferably from 0.01 to 5 mass %, based on the ink.

The ink for use in the inkjet recording method of the present invention can be produced by dissolving or dispersing a dye and preferably a surfactant in an aqueous medium. The "aqueous medium" as used in the present invention means water or a mixture of water and a slight amount of a water-miscible organic solvent, where additives such as wetting agent, stabilizer and antiseptic are added, if desired.

At the preparation of the ink solution for use in the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various methods known in the art can be used, such as flow stirring and stirring utilizing the shearing force by means of a reversal agitator or a dissolver. Also, a stirring method utilizing the shearing force with the bottom surface of a container, such as magnetic stirrer, can be preferably used.

Examples of the water-miscible organic solvent which can be used in the present-invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the dye used in the ink for use in the present invention is an oil-soluble dye, the ink solution can be prepared by dissolving the oil-soluble dye in a high boiling point organic solvent and emulsification-dispersing it in an aqueous medium.

The high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid), and alkylphosphoric acids (e.g., di-(2-ethylhexyl)phosphoric acid and diphenylphosphoric acid). The high boiling point organic solvent can be used in an amount of, in terms of the mass ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly(N-tert-butylacrylamide)].

Examples of the high boiling point organic solvent for use in the present invention, other than the above-described compounds, and/or the synthesis method of these high boiling point organic solvents include those described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The high boiling point organic solvent is used in a mass ratio of 0.01 to 3.0 times, preferably from 0.01 to 1.0 times, to the oil-soluble dye.

In the present invention, the oil-soluble dye and the high boiling point organic solvent each is used by emulsification-dispersing it in an aqueous medium. At the emulsification dispersion, a low boiling point organic solvent may be used depending on the case from the standpoint of emulsifiability. The low boiling point organic solvent is an organic solvent having a boiling point of about 30° C. to 150° C. at atmospheric pressure. Preferred examples thereof include esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane), however, the present invention is not limited thereto.

In the emulsification dispersion, an oil phase obtained by dissolving the dye in a high boiling point organic solvent or depending on the case, in a mixed solvent of a high boiling point organic solvent and a low boiling point organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, however, a so-called phase inversion emulsification method of adding dropwise an aqueous phase in an oil phase can also be preferably used. The above-described emulsification method can also be applied when the dye for use in the present invention is water-soluble and the additive is oil-soluble.

In performing the emulsification dispersion, various surfactants can be used. Preferred examples thereof include anionic surfactants such as fatty acid salt, alkylsulfuric ester salt, alkylbenzenesulfonate, alkyl-naphthalenesulfonate, dialkylsulfosuccinate, alkyl-phosphoric ester salt, naphthalenesulfonic acid formalin condensate and polyoxyethylene-alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

For the purpose of stabilizing the dispersion immediately after the emulsification, a water-soluble polymer may also be added in combination with the surfactant. As the water-soluble polymer, polyvinyl alcohol, polyvinylpyrrolidone, polyethylene oxide, polyacrylic acid, polyacrylamide, and copolymers thereof are preferably used. In addition, natural water-soluble polymers such as polysaccharides, casein and gelatin are also preferably used. Furthermore, for the stabilization of the dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers and acrylonitriles, can also be used in combination. This polymer preferably contains —$SO_3^-$ or —$COO^-$. In the case of using in combination this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing an oil-soluble dye or a high boiling point organic solvent according to the emulsification dispersion, control of the particle size is important. In order to elevate the color purity or density of an image formed by the ink jetting, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418. For example, the ink solution is diluted with distilled water such that the particle concentration in the ink becomes from 0.1 to 1 mass %, and then the particle size can be easily measured by a commercially available volume average particle size measuring apparatus (for example, Microtrac UPA, manufactured by Nikkiso K.K.). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles with the volume of the particle and dividing the sum total of the obtained values by the total volume of particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about failure or slippage in the ejection of ink and seriously affect the printing performance. In order to prevent these troubles, it is important that when an ink is prepared, the number of particles having a particle size of 5 μm or more and the number of particles having a particle size of 1 μm or more are reduced to 10 or less and 1,000 or less, respectively, in 1 μl of ink.

For removing these coarse particles, a known method such as centrifugal separation or microfiltration can be used. This separation step may be performed immediately after the emulsification dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As the emulsifying apparatus, known devices such as simple stirrer, impeller stirring system, in-line stirring system, mill system such as colloid mill, and ultrasonic system can be used, however, a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P. V Gaulin Inc.), Microfluidizer (manufactured by Microfluidex Inc.) and Altimizer (produced by Sugino Machine).

The recent high-pressure homogenizer with a mechanism of pulverizing particles in an ultrahigh pressure jet stream described in U.S. Pat. No. 5,720,551 is particularly effective for the emulsification dispersion of the present invention. Examples of the emulsifying apparatus using this ultrahigh pressure jet stream include DeBEE2000 (manufactured by BEE International Ltd.).

In performing the emulsification by a high-pressure emulsification dispersing apparatus, the pressure is 50 MPa or more, preferably 60 MPa or more, more preferably 180 MPa or more.

A method of using two or more emulsifying devices, for example, emulsification in a stirring emulsifier and then passing through a high-pressure homogenizer, is particularly preferred. Also, a method of once emulsification-dispersing the dye solution by such an emulsifying apparatus and after adding additives such as wetting agent and surfactant, again passing the dispersion through a high-pressure homogenizer until the ink is filled into a cartridge is preferred.

In the case of containing a low boiling point organic solvent in addition to a high boiling point organic solvent, the low boiling point solvent is preferably removed in view of stability of the emulsified product, safety and hygiene. For removing the low boiling point solvent, various known methods can be used according to the kind of solvent. Examples of the method include evaporation, vacuum evaporation and ultrafiltration. This removal of the low boiling point organic solvent is preferably performed as soon as possible immediately after the emulsification.

The preparation method of the inkjet recording ink is described in detail in JP-A-5-148436, JP-A-5-295312, JP-A-7-97541, JP-A-7-82515 and JP-A-7-118584 and those described in these patent publications can be utilized also in the preparation of the inkjet recording ink for use in the present invention.

In the inkjet recording ink for use in the present invention, additives such as drying inhibitor for preventing clogging due to drying of ink at the ejection port, permeation accelerator for attaining more successful permeation of ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent can be appropriately selected and used in an appropriate amount.

The drying inhibitor for use in the present invention is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 mass %.

Examples of the permeation accelerator for use in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the permeation accelerator in the ink. The permeation accelerator is preferably used in an amount of causing no blurring of printed letter or no print through.

In the present invention, an ultraviolet absorbent is used for improving the preservability of image and examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure* No. 24239, and compounds of absorbing ultraviolet light and emitting fluorescent light, so-called fluorescent brightening agents, represented by stilbene-base compounds and benzoxazole-base compounds.

In the present invention, an antioxidant is used for improving the preservability of image and various organic and metal complex-base discoloration inhibitors can be used therefor. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 5.00 mass %.

These are described in detail in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammon thioglycolate, diisopropyl-ammonium nitrite, pentaerythritol tetranitrate, dicyclohexylammonium nitrite and benzotriazole. The rust inhibitor is preferably used in the ink in an amount of 0.02 to 5.00 mass %.

The pH adjusting agent for use in the present invention is suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance is liable to deteriorate. Examples of the pH adjusting agent include, as basic one, organic bases and inorganic alkalis, and as acidic one, organic acids and inorganic acids.

Examples of the basic compound which can be used include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate; and organic bases such as aqueous ammonia, methylamine, ethylamine, diethylamine, triethylamine, ethanolamine, diethanolamine, triethanol-amine, ethylenediamine, piperidine, diazabicyclooctane, diazabicyloundecene, pyridine, quinoline, picoline, lutidine and collidine.

Examples of the acidic compound which can be used include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate; and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolinic acid and quinolinic acid.

The conductivity of the ink for use in the present invention is preferably from 0.01 to 10 S/m, more preferably from 0.05 to 5 S/m.

The conductivity can be measured by an electrode method using a commercially available saturated potassium chloride.

The conductivity can be controlled mainly by the ion concentration in a water-base solution. In the case where the salt concentration is high, desalting can be performed by using ultrafiltration membrane or the like. Also, in the case of controlling the conductivity by adding a salt or the like, the conductivity can be controlled by adding various organic or inorganic salts.

Examples of the inorganic salt which can be used include inorganic compounds such as potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate, and examples of the organic salt which can be used include organic compounds such as sodium acetate, potassium acetate, potassium tartrate, sodium tartrate, sodium benzoate, potassium benzoate, sodium p-toluenesulfonate, potassium saccharinate, potassium phthalate and sodium picolinate.

The conductivity can also be controlled by selecting the components of the aqueous medium described later.

The viscosity at 25° C. of the ink for use in the present invention is preferably from 1 to 20 mPa·s, more preferably from 2 to 15 mPa·s, still more preferably from 2 to 10 mPa·s. If the viscosity exceeds 30 mPa·s, the fixing rate of the recorded image decreases and the ejection performance also decreases, whereas if it is less than 1 mPa·s, the recorded image is blurred and therefore, decreased in the grade.

The viscosity can be freely adjusted by the amount of the ink solvent added. Examples of the ink solvent include glycerin, diethylene glycol, triethanolamine, 2-pyrrolidone, diethylene glycol monobutyl ether and triethylene glycol monobutyl ether.

A viscosity adjusting agent may also be used. Examples of the viscosity adjusting agent include celluloses, water-soluble polymers such as polyvinyl alcohol, and nonionic surfactants. These are described in detail in *Nendo Chosei Gijutsu* (*Viscosity Adjusting Technology*), Chap. 9, Gijutsu Joho Kyokai (1999), and *Inkjet Printer Yo Chemicals* (98 Zoho)—Zairyo no Kaihatsu Doko•Tenbo Chosa—(*Chemicals for Inkjet Printer* (*Enlarged Edition of* 98)—*Survey on Tendency•Prospect of Development of Materials*—), pp. 162–174, CMC (1997).

The method for measuring the viscosity of liquid is described in detail in JIS Z8803 but the viscosity can be easily measured by a commercially available viscometer. For example, the rotational viscometer includes B-type viscometer and E-type viscometer, manufactured by Tokyo Keiki Co., Ltd. In the present invention, the viscosity is measured at 25° C. by using a vibrating viscometer Model VM-100A-L manufactured by Yamaichi Denki. The unit of viscosity is pascal second (Pa·s) but usually, milli-pascal second (mPa·s) is used.

Irrespective of dynamic surface tension or static surface tension, the surface tension of the ink for use in the present invention is preferably from 20 to 50 mN/m, more preferably from 20 to 40 mN/m, at 25° C. If the surface tension exceeds 50 mN/m, ejection stability and printing quality are seriously deteriorated, for example, bleeding at color mixing or feathering is caused, whereas if the surface tension of ink is less than 20 mN/m, printing failure may occur due to attachment of ink to the surface of hardware at the ejection.

For the purpose of adjusting the surface tension, a cationic, anionic or nonionic surfactant of various types described above can be added. The surfactant is preferably used in the range from 0.01 to 20 mass %, more preferably from 0.1 to 10 mass %, based on the inkjet recording ink. The surfactants can be used in combination of two or more thereof.

As the method for measuring the static surface tension, a capillary elevation method, a dropping method, a suspended ring method and the like are known. In the present invention, a vertical plate method is used as the method for measuring the static surface tension.

When a glass or platinum thin plate is vertically hung while dipping a part of the plate in a liquid, a surface tension of the liquid acts downward along the contact portion between the liquid and the plate. This force is balanced with an upward force and thereby, the surface tension can be measured.

As the method for measuring the dynamic surface tension, a vibrating jet method, a meniscus dropping method, a maximum bubble pressure method and the like are known as described, for example, in *Shin Jikken Kagaku Koza, Kaimen to Colloid* (*New Lecture of Experimental Chemistry, Interface and Colloid*), Vol. 18, pp. 69–90, Maruzen (1977). Furthermore, a liquid film rupturing method described in JP-A-3-2064 is known. In the present invention, a differential bubble pressure method is used as the method for measuring the dynamic surface tension. The principle and method of the measurement are described below.

When a bubble is produced in a solution rendered uniform by stirring, a gas-liquid interface is newly produced and surfactant molecules in the solution gather to the water surface at a constant speed. When the bubble rate (bubble production rate) is changed, as the production rate decreases, a larger number of surfactant molecules gather to the bubble surface. Therefore, the maximum bubble pressure immediately before the bubble bursts becomes small and the maximum bubble pressure (surface tension) for the bubble rate can be detected. The dynamic surface tension is preferably measured by a method of producing bubbles in a solution using large and small two probes, measuring the differential pressure in the maximum bubble pressure state between two probes, and calculating the dynamic surface tension.

The nonvolatile component in the ink for use in the present invention is preferably from 10 to 70 mass % of the entire amount of the ink in view of ejection stability of ink, printing image quality, various fastnesses of image, and reduction in blurring of image after printing or in stickiness on the printed surface. The nonvolatile component is more preferably from 20 to 60 mass % in view of ejection stability of ink and reduction in blurring of image after printing.

The nonvolatile component as used herein means a liquid or solid component having a boiling point of 150° C. or more at 1 atm or a high molecular amount component. The nonvolatile component in the inkjet recording ink includes a dye and a high boiling point solvent and also includes a polymer latex, a surfactant, a dye stabilizer, a fungicide and a buffering agent which are added, if desired. Many of these nonvolatile components except for the dye stabilizer reduce the dispersion stability of ink and even after printing, remain on the inkjet image-receiving paper to inhibit the aggregation and in turn stabilization of dye on the image-receiving paper and worsen various fastnesses of the image area or blurring of the image under high humidity condition.

In the present invention, a high molecular amount compound may also be contained. The high molecular amount compound as used herein means all polymer compounds having a number average molecular weight of 5,000 or more contained in the ink. Examples of the polymer compound include a water-soluble polymer compound which substantially dissolves in an aqueous medium, a water-dispersible polymer compound such as polymer latex and polymer emulsion, and an alcohol-soluble polymer compound which dissolves in a polyhydric alcohol used as an auxiliary solvent, however, the high molecular weight compound as used in the present invention includes all polymer compounds which substantially dissolve or disperse uniformly in the ink solution.

Specific examples of the water-soluble polymer compound include water-soluble polymers such as polyvinyl alcohol, silanol-modified polyvinyl alcohol, carboxymethyl cellulose, hydroxyethyl cellulose, polyvinylpyrrolidone, polyalkylene oxide (e.g., polyethylene oxide, polypropylene oxide) and polyalkylene oxide derivatives; natural water-soluble polymers such as polysaccharides, starch, cationized starch, casein and gelatin; aqueous acrylic resins such as polyacrylic acid, polyacrylamide and copolymers thereof; aqueous alkyd resin; and water-soluble polymer compounds having an $-SO_3^-$ or $-COO^-$ group within the molecule and substantially dissolvable in an aqueous medium.

Specific examples of the polymer latex include a styrene-butadiene latex, a styrene-acryl latex and a polyurethane latex, and specific examples of the polymer emulsion include an acryl emulsion.

These water-soluble polymer compounds can be used individually or in combination of two or more thereof.

As described above, the water-soluble polymer compound is used as the viscosity adjusting agent so as to adjust the viscosity of ink to a viscosity region of giving good ejection property, however, if the amount of the water-soluble polymer compound added is large, the viscosity of ink increases to reduce the ejection stability of ink solution and after aging of ink, the nozzle is readily clogged by the precipitate.

The amount added of the polymer compound as the viscosity adjusting agent varies depending on the molecular weight of the compound added (as the molecular weight is higher, the amount added can be smaller), but the amount added is from 0 to 5 mass %, preferably from 0 to 3 mass %, more preferably from 0 to 1 mass %, based on the entire amount of ink.

In the present invention, apart from the above-described surfactant, a nonionic, cationic or anionic surfactant is used as the surface tension adjusting agent. Examples of the anionic surfactant include a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate and a polyoxyethylenealkylsulfuric ester salt. Examples of the nonionic surfactant include a polyoxyethylene alkyl ether, a polyoxyethylene alkylallyl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (37) to (38)) and *Research Disclosure*, No. 308119 (1989) can be used.

In the present invention, if desired, various cationic, anionic or nonionic surfactants described above may be used as a dispersant or a dispersion stabilizer, and a fluorine- or silicone-base compound or a chelating agent represented by EDTA may be used as a defoaming agent.

The image-receiving material for use in the present invention is described below.

As the image-receiving material for use in the present invention, a recording paper or film described below can be used.

The support which can be used for the recording paper or film used as the image-receiving material in the present invention is produced, for example, from a chemical pulp such as LBKP and NBKP, a mechanical pulp such as GP, PGW, RMP, TMP, CTMP, CMP and CGP, a waste paper pulp such as DIP, by mixing, if desired, conventionally known additives such as pigment, binder, sizing agent, fixing agent, cation agent and paper strength increasing agent, and then sheeting the mixture using various devices such as Fourdrinier paper machine and cylinder paper machine. Other than these supports, synthetic paper or plastic film may be used as the support. The thickness of the support is preferably from 10 to 250 μm and the basis weight is preferably from 10 to 250 g/m$^2$.

An image-receiving layer and a backcoat layer may be provided on the support as it is to produce an image-receiving material used with the ink for use in the present invention, or an image-receiving layer and a backcoat layer may be provided after providing a size press or an anchor coat layer by using starch, polyvinyl alcohol or the like, to produce an image-receiving material. The support may also be subjected to a flattening treatment by a calendering device such as machine calender, TG calender and soft calender.

In the case where the acid precursor for use in the present invention is contained in the image-receiving material, the acid precursor is preferably contained in the image-receiving layer.

In the present invention, the support is preferably paper or plastic film of which both surfaces are laminated with polyolefin (for example, polyethylene, polystyrene, polybutene or a copolymer thereof) or polyethylene terephthalate. In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production method (gas phase method) or a silicic acid hydrate obtained by a wet production method.

Specific examples of the recording paper containing the pigment in the image-receiving layer, which can be used, include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivatives, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and separation resistance of the ink-accepting layer.

The image-receiving layer may contain a mordant, a water-proofing agent, a light fastness enhancer, a gas resistance enhancer, a surfactant, a hardening agent and other additives in addition to the pigment and the aqueous binder.

The mordant added to the image-receiving layer is. preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallyl-ammonium chloride and cation polyacrylamide. The content of the cationic resin is preferably from 1 to 15 mass %, more preferably from 3 to 10 mass %, based on the entire solid content of the ink-accepting layer.

Examples of the light fastness enhancer and the gas resistance enhancer include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing organic acids, benzotriazole compounds, benzophenone compounds, triazine compounds, heterocyclic compounds, water-soluble metal salts, organic metal compounds and metal complexes.

Specific examples of these compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, a releasability improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, the materials described, for example, in JP-A-1-161236 (page 222), JP-A-9-263036, JP-A-10-119423 and JP-A-2001-310547 can be used.

Other additives added to the image-receiving layer include a pigment dispersant, a thickener, a defoaming agent, a dye, a fluorescent brightening agent, an antiseptic, a pH adjusting agent, a matting agent, a hardening agent and the like. The ink-accepting layer may be composed of either one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic, a water-proofing agent and the like.

In a constituent layer (including the back layer) of the inkjet recording paper or film, a polymer fine particle dispersion may be added. The polymer fine particle dispersion is used for the purpose of improving film properties, for example, stabilizing the dimension and preventing curling, adhesion or film cracking. The polymer fine particle dispersion is described in JP-A-62-245258, JP-A-62-136648 and JP-A-62-110066. When a polymer fine particle dispersion having a low glass transition temperature (40° C. or less) is added to a layer containing a mordant, the layer can be prevented from cracking or curling. The curling can also be prevented by adding a polymer fine particle dispersion having a high glass transition temperature to a back layer.

The inkjet recording ink for use in the present invention can be used for uses other than the inkjet recording, such as a material for display image, an image-forming material for interior decoration and an image-forming material for outdoor decoration.

Examples of the material for display image include various materials such as poster, wall paper, ornamental goods (e.g., ornament, doll), handbill for commercial advertisement, wrapping paper, wrapping material, paper bag, vinyl bag, package material, billboard, image drawn or attached to the side face of traffic (e.g., automobile, bus, electric car), and clothes with a logo. In the case of using the dye of the present invention as a material for forming a display image, the image includes not only a strict image but also all patterns formed by a dye, which can be acknowledged by a human, such as abstract design, letter and geometrical pattern.

Examples of the material for interior decoration include various materials such as wall paper, ornamental goods (e.g., ornament, doll), luminaire member, furniture member, and design member of floor or ceiling. In the case of using the dye of the present invention as a material for forming an image, the image includes not only a strict image but also all patterns formed by a dye, which can be acknowledged by a human, such as abstract design, letter and geometrical pattern.

Examples of the material for outdoor decoration include various materials such as wall material, roofing material, billboard, gardening material, outdoor ornamental goods (e.g., ornament, doll), and outdoor luminaire member. In the case of using the dye of the present invention as a material for forming an image, the image includes not only a strict image but also all patterns formed by a dye, which can be acknowledged by a human, such as abstract design, letter and geometrical pattern.

In these uses, examples of the medium where the pattern is formed include various materials such as paper, fiber, cloth (including non-woven fabric), plastic, metal and ceramic. Examples of the dyeing form include mordanting, printing and fixing of a dye in the form of a reactive dyestuff having introduced thereinto a reactive group. Among these, preferred is dyeing by mordanting.

Each step in the inkjet recording method of the present invention is described below.

In the production of ink, ultrasonic vibration may be added, for example, in the step of dissolving additives such as dye.

The ultrasonic vibration is added so as to prevent the ink from generating a bubble due to a pressure applied in the recording head. More specifically, an ultrasonic energy equal to or greater than the energy imposed in the recording head is previously applied in the process of producing the ink to thereby remove a bubble.

The ultrasonic vibration is usually applied by using an ultrasonic wave having a frequency of 20 kHz or more, preferably 40 kHz or more, more preferably 50 kHz or more. The energy added to liquid by the ultrasonic vibration is usually $2\times10^7$ J/m$^3$ or more, preferably $5\times10^7$ J/m$^3$ or more, more preferably $1\times10^8$ J/m$^3$ or more. The time period where the ultrasonic vibration is applied is usually on the order from 10 minutes to one hour.

No matter when the ultrasonic vibration is applied, the effect can be attained as long as it is applied after the dye is charged into a medium. The effect is also obtained even by applying ultrasonic vibration after the finished ink is once stored. However, the ultrasonic vibration is preferably applied at the time of dissolving and/or dispersing the dye in a medium, because the effect of removing a bubble is larger and the dissolution and/or dispersion of a dyestuff in a medium is accelerated by the ultrasonic vibration.

That is, the step of applying at least ultrasonic vibration can be performed during or after the step of dissolving and/or dispersing the dye in a medium. In other words, the step of applying at least ultrasonic vibration can be optionally performed once or more after the preparation of ink until the ink is finished as a product.

In a practical embodiment, the step of dissolving and/or dispersing the dye in a medium preferably comprises a step of dissolving the dye in a partial medium out of the entire medium and a step of mixing the remaining medium. The ultrasonic vibration is preferably applied at least in either one of these steps, more preferably in the step of dissolving the dye in a partial medium out of the entire medium.

The step of mixing the remaining solvent may be a single step or a multiple step.

In the production of ink for use in the present invention, a degassing step under heating or reduced pressure is preferably used in combination, because the effect of removing a bubble in the ink is enhanced. The degassing step under heating or reduced pressure is preferably performed simultaneously with or after the step of mixing the remaining medium.

Examples of the ultrasonic vibration-generating means for use in the step of applying ultrasonic vibration include known devices such as ultrasonic disperser.

In the production of the ink for use in the present invention, the step of removing dusts as the solid content by filtration, which is performed after the preparation of ink solution, is important. This operation is performed by using a filtration filter and the filtration filter used here is a filter having an effective size of 1 μm or less, preferably from 0.05 to 0.3 μm, more preferably from 0.25 to 0.3 μm. As for the construction material of the filter, various materials can be used, however, in the case of an ink using a water-soluble dye, a filter produced for aqueous solvents is preferably used. In particular, a filter made of a polymer material, which less generates wastes, is preferred. The filtration may be performed by feeding and passing the solution through a filter, and filtration under pressure or filtration under reduced pressure either can be used.

After the filtration, air is often taken in into the solution. A bubble ascribable to this air also gives rise to the disorder of image in the inkjet recording in many cases and therefore, the above-described defoaming step is preferably provided as a separate step. For the defoaming, a method of allowing the solution after filtration to stand may be used or various methods such as ultrasonic defoaming or reduced-pressure defoaming using a commercially available device can be utilized. In the case of defoaming by an ultrasonic wave, the defoaming operation is preferably performed for 30 seconds to 2 hours, more preferably on the order from 5 minutes to one hour.

This operation is preferably performed in a space such as clean room or clean bench so as to prevent mingling of dusts at the operation. In the present invention, this operation is preferably performed particularly in a space having a cleanness degree of Class 1,000 or less. The "cleanness degree" as used herein means a value measured by a dust counter.

In the present invention, the hitting volume of ink on a recording material is preferably from 0.1 to 100 pl, more preferably from 0.5 to 50 pl, still more preferably from 2 to 50 pl.

The present invention is not limited in the inkjet recording system and is used for a known system, for example, an electric charge controlling system of jetting out the ink by using an electrostatic induction force, a drop-on-demand system (pressure pulse system) of using an oscillation pressure of a piezo element, an acoustic inkjet system of converting electric signals into acoustic beams, irradiating the beams on the ink and jetting out the ink by using a radiation pressure, and a thermal inkjet (bubble jet) system of heating the ink to form a bubble and utilizing the generated pressure.

The inkjet recording system includes a system of ejecting a large number of small-volume ink droplets of a so-called photo ink having a low concentration, a system of using a plurality of inks substantially the same in the color hue but different in the concentration and thereby improving the image quality, and a system using a colorless transparent ink. The hitting volume of ink is controlled mainly by the printer head.

For example, in the case of a thermal inkjet system, the hitting volume can be controlled by the structure of printer head. That is, the ink can be hit in a desired size by changing the ink chamber, heating section and nozzle size. Also, even in the thermal inkjet system, the ink can be hit in a plurality of sizes by providing a plurality of printer heads differing in the heating section or nozzle size.

In the case of a drop-on-demand system using a piezo element, the hitting volume can be changed in view of the structure of printer head similarly to the thermal inkjet system, however, as described later, the ink can be hit in a plurality of sizes with printer heads having the same structure by controlling the waveform of driving signals for driving the piezo element.

In the present invention, the ejection frequency on hitting the ink on a recording material is preferably 1 KHz or more.

In order to record a high-quality image like a photograph, the hitting density must be 600 dpi (number of dots per inch) or more so that an image having high sharpness can be reproduced by a small ink droplet.

In hitting the ink by a head having a plurality of nozzles, the number of heads which can be driven at the same time is restricted, that is, from a few tens to about 200 in the case of a type where a recording paper and a head are moved in the directions orthogonal to each other, and a few hundreds even in the case of a type called line head where the head is fixed. This is because the driving electric power is limited or due to the effect of heat generated in the head on the image, a large number of head nozzles cannot be simultaneously driven.

Here, the recording speed can be increased by elevating the driving frequency.

The hitting frequency can be controlled, in the case of a thermal inkjet system, by controlling the frequency of head-driving signal for heating the head.

In the case of a piezo system, the hitting frequency can be controlled by controlling the frequency of signal for driving the piezo.

The driving of piezo head is described. The hitting size, hitting speed and hitting frequency are determined in a printer control section based on the signal of an image to be printed, and a signal for driving a printer head is prepared. The driving signal is supplied to the printer head and by the signal for driving the piezo, the hitting size, hitting speed and hitting frequency are controlled. The hitting size and hitting speed are determined by the shape and amplitude of the driving waveform, and the frequency is determined by the cycle period of signal.

When the hitting frequency is set to 10 KHz, the head is driven every 100 micro-seconds and one-line recording is completed in 400 micro-seconds. When the travelling speed of the recording paper is set such that the recording paper moves 1/600 inch, namely, about 42 micron per 400 micro-seconds, the printing can be attained at a rate of one sheet per 1.2 seconds.

With respect to the structure of printing apparatus or printer, the embodiment disclosed, for example, in JP-A-11-170527 is preferred. With respect to the ink cartridge, the embodiment disclosed, for example, in JP-A-5-229133 is preferred. With respect to the suction and the cap or the like covering the printing head 28 at the suction, those disclosed, for example, in JP-A-7-276671 are preferred. In the vicinity of head, a filter for eliminating a bubble, disclosed in JP-A-9-277552, is suitably provided.

Also, the surface of nozzle is suitably subjected to a water repellent treatment described in Japanese Patent Application No. 2001-016738. The present invention may be used for a printer connected to a computer or for an apparatus specialized to print a photograph.

The inkjet recording method of the present invention is characterized in that an ink composition for inkjet recording obtained by dissolving and/or dispersing at least one dye represented by formula (1) in an aqueous medium is hit on a recording material at an average hitting speed of 2 m/sec or more, preferably 5 m/sec or more.

The hitting speed is controlled by controlling the shape and amplitude of the waveform for driving the head.

Furthermore, by using a plurality of driving waveforms and selecting an appropriate waveform, the ink can be hit in a plurality of sizes with the same printer head.

EXAMPLES

Examples 1 to 8 and Comparative Examples 1 to 3

The present invention is described in greater detail below by referring to Examples, however, the present invention is not limited thereto. In Examples, unless otherwise indicated, the "parts" and "%" are "parts by mass (weight0)" and "% by mass (weight)", respectively, and the "average molecular weight" and "polymerization degree" are "mass average molecular weight" and "mass average polymerization degree", respectively.

<Production of Recording Sheet>

(Production of Support)

Wood pulp comprising 100 parts of LBKP was beaten to a Canadian freeness of 300 ml by using a double disc refiner. Thereto, 0.5 parts of epoxidized behenic acid amide, 1.0 part of anionic polyacrylamide, 0.1 part of polyamide polyamine epichlorohydrin and 0.5 parts of cationic polyacrylamide, each in a bone dry mass ratio to pulp, were added. Using the resulting mixture, a stock paper having a basis weight of 170 $g/m^2$ was prepared by using a Fourdrinier paper machine.

In order to adjust the surface size of the stock paper obtained above, 0.04% of a fluorescent brightening agent ("Whitex BB" produced by Sumitomo Chemical Co., Ltd.) was added to an aqueous 4% polyvinyl alcohol solution and impregnated into the stock paper to 0.5 $g/m^2$ in terms of the bone dry mass. After drying, the paper was calendered to obtain a base paper adjusted to a density of 1.05 g/ml.

The wire surface (back surface) of the base paper obtained was subjected to a corona discharge treatment and coated with a high density polyethylene to a thickness of 19 μm by a melt-extruder to form a resin layer comprising a mat surface (hereinafter, the resin layer surface is called a "back surface"). The resin layer in the back surface side was further subjected to a corona discharge treatment and thereon, a dispersion prepared by dispersing, as the antistatic agent, aluminum oxide ("Alumina Sol 100" produced by Nissan Chemicals Industries, Ltd.) and silicon dioxide ("Snowtex O" produced by Nissan Chemicals Industries, Ltd.) in water at a mass ratio of 1:2 was coated to have a dry mass of 0.2 g/m$^2$.

The felt surface (front surface) in the side where the resin layer was not provided was subjected to a corona discharge treatment and thereon, a low density polyethylene containing 10% of anatase-type titanium dioxide, a trace amount of ultramarine blue and 0.01% (based on polyethylene) of a fluorescent brightening agent and having an MFR (melt flow rate) of 3.8 was extruded to a thickness of 29 μm by a melt-extruder to form a high-gloss thermoplastic resin layer in the front surface side of the base paper (hereinafter, this high-gloss surface is called a "front surface"), thereby preparing a support.

(Production of Inkjet Recording Sheet R-1 and R-2 to R-8)

(Preparation of Coating Solution A for Coloring Material-Accepting Layer)

(1) Vapor phase process silica fine particle, (2) ion exchanged water and (3) "PAS-M-1" (dispersant) in the composition shown below were mixed and dispersed at a rotation number of 10,000 rpm for 20 minutes by using KD-P (manufactured by Shinmaru Enterprises K.K.). Thereto, a solution containing (4) polyvinyl alcohol, (5) boric acid, (6) polyoxyethylene lauryl ether and (7) ion exchanged water was added and redispersed at a rotation number of 10,000 rpm for 20 minutes to prepare Coating Solution A for Coloring Material-Accepting Layer.

The mass ratio of silica fine particle and water-soluble resin (PB ratio=(1):(4)) was 4.5:1 and the pH of Coating Solution A for Coloring Material-Accepting Layer was 5.0, revealing that the coating solution was acidic.

<Composition of Coating Solution A for Coloring Material-Accepting Layer>

| | |
|---|---|
| (1) Vapor phase process silica fine particle (inorganic fine particle) ("Reoseal QS-30" produced by Tokuyama Corp., average primary particle size: 7 nm) | 10.0 parts |
| (2) Ion exchanged water | 51.7 parts |
| (3) "PAS-M-1" (60% aqueous solution) (dispersant, produced by Nitto Boseki Co., Ltd.) | 0.83 parts |
| (4) 8% Aqueous solution of polyvinyl alcohol (water-soluble resin) ("PVA 124" produced by Kuraray Co., Ltd., saponification degree: 98.5%, polymerization degree: 2,400) | 27.8 parts |
| (5) Boric acid (crosslinking agent) | 0.4 parts |
| (6) Polyoxyethylene lauryl ether (surfactant) ("Emulgen 109P" produced by Kao Corp. (10% aqueous solution), HLB: 13.6) | 1.2 parts |
| (7) Ion exchanged water | 33.0 parts |

(Production of Inkjet Recording Sheet)

The front surface of the support produced above was subjected to a corona discharge treatment and then, Coating Solution A for Coloring Material-Accepting Layer was coated on the front surface of the support to a coated amount of 200 ml/m$^2$ by using an extrusion die coater (coating step) and dried at 80° C. by a hot air dryer (air speed: from 3 to 8 m/sec) until the solid content concentration of the coated layer reached 20%. During this process, the coated layer showed constant rate drying. Immediately thereafter, the support was dipped in Mordant Solution B having a composition shown below for 30 seconds to attach the mordant solution on the coated layer in an amount of 20 g/m$^2$ (a step of imparting a mordant solution) and then dried at 80° C. for 10 minutes (drying step). In this way, Inkjet Recording Sheet R-1 of the present invention, where a coloring material-accepting layer having a dry thickness of 32 μm was provided, was produced.

<Composition of Mordant Coating Solution B>

| | |
|---|---|
| (1) Boric acid (crosslinking agent) | 0.65 parts |
| (2) 10% Aqueous solution of polyallylamine "PAS-10C" (mordant, produced by Nitto Boseki Co., Ltd.) | 25 parts |
| (3) Ion exchanged water | 59.7 parts |
| (4) Ammonium chloride (surface pH adjusting agent) | 0.8 parts |
| (5) Polyoxyethylene lauryl ether (surfactant, "Emulgen 109P" produced by Kao Corp., 2% aqueous solution, HLB: 13.6) | 10 parts |
| (6) 10% Aqueous solution of Megafac "F1405" (fluorine-containing surfactant, produced by Dai-Nippon Ink & Chemicals, Inc.) | 2.0 parts |

Inkjet Recording Sheets R-2 to R-8 each having thoroughly the same composition as Inkjet Recording Sheet R-1 above except for adding the additives as shown in Table 1 to Coating Solution A in the production of Inkjet Recording Sheet R-1 were produced.

<Preparation of Ink>

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare Light Magenta Ink Solution LM-101.

[Formulation of Light Magenta Ink LM-101]

| | |
|---|---|
| (Solid Contents) | |
| Magenta dye (MD-1) | 7.5 g/liter |
| Urea | 37 g/liter |
| (Liquid Components) | |
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 15 g/liter |
| Surfynol STG (SW) | 10 g/liter |

Also, Magenta Ink Solution M-101 was prepared by increasing the magenta dye (MD-1) to 23 g in the formation above.

| [Formulation of Magenta Ink M-101] | |
| --- | --- |
| (Solid Contents) | |
| Magenta dye (MD-1) | 23 g/liter |
| Urea | 37 g/liter |
| (Liquid Components) | |
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 15 g/liter |
| Surfynol STG | 10 g/liter |

Inks LM-102 to LM-108 and Inks M-102 to M-108 each having thoroughly the same composition except for adding the additives as shown in Table 1 to LM-101 or M-101 were produced.

MD-1 used above is shown below.

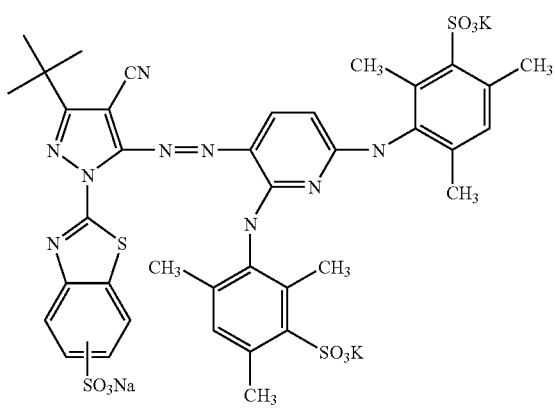

TABLE 1

| | Ink | Recording Sheet |
| --- | --- | --- |
| Comparative Example 1 | LM-101 (X-14, 15 g/l)<br>M-101 (X-14, 15 g/l) | R-1 (no additive) |
| Comparative Example 2 | LM-102 (X-14, 15 g/l)<br>M-102 (X-14, 15 g/l) | R-2 (250 mg/m² of POEP-1 was added to Coating Solution A in R-1) |
| Comparative Example 3 | LM-103 (X-14, 15 g/l)<br>M-103 (X-14, 15 g/l) | R-3 (250 mg/m² of POEN-1 was added to Coating Solution A in R-1) |
| Example 4 | LM-104 (X-14, 15 g/l)<br>M-104 (X-14, 15 g/l) | R-4 (500 mg/m² of Y-8 was added to Coating Solution A in R-1) |
| Example 5 | LM-105 (X-4, 15 g/l)<br>M-105 (X-4, 15 g/l) | R-5 (500 mg/m² of Y-8 was added to Coating Solution A in R-1) |
| Example 6 | LM-106 (X-14, 15 g/l)<br>M-106 (X-14, 15 g/l) | R-6 (250 mg/m² of Y-6 was added to Coating Solution A in R-1) |
| Example 7 | LM-107 (X-4, 15 g/l)<br>M-107 (X-4, 15 g/l) | R-7 (250 mg/m² of Y-6 was added to Coating Solution A in R-1) |
| Example 8 | LM-108 (X-13, 5 g/l; X-15, 15 g/l)<br>M-108 (X-13, 5 g/l; X-15, 15 g/l) | R-8 (500 mg/m² of Y-11 was added to Coating Solution A in R-1) |

POEP-1: Polyoxyethylene nonylphenyl ether (PEO chain average: 30)
POEN-1: Polyoxyethylene naphthyl ether (PEO chain average: 50

These inkjet recording sheets each was set in the paper feed part of an inkjet printer PM950C (manufactured by Seiko Epson Corporation) and the inks were filled in magenta ink•light magenta ink cartridges of PM-950C. By using the inks of PM-950C for other colors, a magenta monochromatic image was printed. The image obtained was evaluated on the blurring under high humidity conditions.

(Evaluation Test)

In the evaluation of blurring of the image under high humidity conditions, a printing pattern where four magenta square patterns each in a size of 3 cm×3 cm were arrayed to form a two-line and two-column table shape with a 1-mm white clearance between respective square patterns was prepared and after this image sample was stored under conditions of 25° C. and 90% RH for 72 hours, the blurring of dye in the white clearance was observed. The sample was rated A when the increase of black density in the white clearance based on the black density immediately after printing was 0.01 or less as measured by a Bk filter of Status A, rated B when the increase was from 0.01 to 0.05, or rated C when the increase was 0.05 or more.

(Example 9)

Deionized water was added to the following components to make 1 liter and the resulting solution was stirred for 1 hour under heating at 30 to 40° C. Thereafter, the solution was filtered under reduced pressure through a microfilter having an average pore size of 0.25 μm to prepare a colorless ink not containing a dye.

| [Formulation of Colorless Ink] | |
| --- | --- |
| X-13 | 5 g/liter |
| X-15 | 15 g/liter |
| Proxel | 3.5 g/liter |
| Diethylene glycol | 150 g/liter |
| Glycerin | 130 g/liter |
| Triethylene glycol monobutyl ether | 130 g/liter |

The colorless ink obtained was filled in a black ink cartridge of PM-950C and by using LM-101 and M-101 as magenta inks and using genuine inks of PM-950C for other colors, an ink set was prepared. A two-line and two-column table shape was printed on Recording Sheet R-8 used in Example 1 by using the magenta inks in the same manner as in Examples 1 to 8 and the printed portion was then subjected to solid printing with the colorless ink prepared above.

The blurring under high humidity conditions was performed in the same manner as in Evaluation Test above.

The results obtained are shown in the Table below.

TABLE 2

| | Magenta Blurring |
| --- | --- |
| Sample using genuine PM photographic sheet of EPSON and ink set of PM-950 C | C |
| Comparative Example 1 | C |
| Comparative Example 2 | C |
| Comparative Example 3 | C |
| Example 4 | A |
| Example 5 | A |
| Example 6 | A |
| Example 7 | A |
| Example 8 | A |
| Example 9 | A |

As seen from the results in the Table, the samples using the inkjet recording sheet of the present invention surpassed all comparative examples in view of black blurring.

According to the constitution of the present invention, an inkjet recording method of giving an image ensured with less occurrence of blurring even under high humidity conditions can be provided.

This application is based on Japanese Patent application JP 2002-296451, filed Oct. 9, 2002, the entire content of which is hereby incorporated by reference, the same as if set forth at length.

What is claimed is:

1. An inkjet recording method comprising ejecting ink droplets on an image-receiving material according to recording signals to record an image on the image-receiving material, wherein at least one of the ink and the image-receiving material comprises an acid precursor capable of releasing an acid by a chemical reaction, wherein one of the acid precursor and a compound which reacts with the acid precursor to release an acid is contained in the ink, and another one of the acid precursor and the compound is contained in the image-receiving material, wherein the acid precursor is a compound comprising an atom which changes to a hard acid by the chemical reaction or an atomic group which changes to a hard acid by the chemical reaction, and the compound which reacts with the acid precursor to release an acid is a compound comprising a nucleophilic group.

2. The inkjet recording method according to claim 1, wherein the compound which reacts with the acid precursor to release an acid is contained in the image-receiving material.

3. The inkjet recording method according to claim 2, wherein the compound that reacts with the acid precursor to release an acid is contained in the image-receiving material in an amount of from 0.05 to 5 g/m$^2$.

4. The inkjet recording method according to claim 1, wherein at least the ink comprises an acid precursor.

5. The inkjet recording method according to claim 4, wherein the ink comprises from 0.5 to 5% by weight of the acid precursor.

6. The inkjet recording method according to claim 1, wherein the compound that reacts with the acid precursor to release an acid is contained in the ink.

7. The inkjet recording method according to claim 6, wherein the compound that reacts with the acid precursor to release an acid is contained in the image-receiving material in an amount of from 0.05 to 5 g/m$^2$.

* * * * *